United States Patent
Lee et al.

(10) Patent No.: US 8,271,684 B2
(45) Date of Patent: Sep. 18, 2012

(54) ELECTRONIC DEVICE, MANAGEMENT SERVER, AND CONTROL METHOD THEREOF FOR CHECKING AN IP ADDRESS

(75) Inventors: Seo-young Lee, Seongnam-si (KR); Jong-hun Kim, Seoul (KR); In-tae Park, Suwon-si (KR); Gyu-sang Jung, Seoul (KR); In-ki Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 719 days.

(21) Appl. No.: 12/027,020

(22) Filed: Feb. 6, 2008
(Under 37 CFR 1.47)

(65) Prior Publication Data

US 2008/0215756 A1  Sep. 4, 2008

(30) Foreign Application Priority Data

Feb. 6, 2007  (KR) ........................ 10-2007-0012243

(51) Int. Cl.
*G06F 15/16* (2006.01)
(52) U.S. Cl. ...................................... 709/245; 709/225
(58) Field of Classification Search .................. 709/245, 709/225
See application file for complete search history.

(56) References Cited

U.S. PATENT DOCUMENTS

| | | | |
|---|---|---|---|
| 6,564,216 B2 * | 5/2003 | Waters | 707/10 |
| 6,988,148 B1 * | 1/2006 | Sheth | 709/245 |
| 7,024,484 B2 | 4/2006 | Alexi | |
| 7,313,610 B2 * | 12/2007 | Held et al. | 709/222 |
| 7,373,429 B2 * | 5/2008 | Furukawa et al. | 709/249 |
| 7,388,855 B2 * | 6/2008 | Madour | 370/338 |
| 7,430,614 B2 * | 9/2008 | Shen et al. | 709/245 |
| 2005/0097360 A1 | 5/2005 | Chu et al. | |

(Continued)

FOREIGN PATENT DOCUMENTS

EP  1482407 A1  12/2004
JP  2002-169694 A  6/2002

OTHER PUBLICATIONS

Office Action dated Jul. 5, 2011 from the State Intellectual Property Office of P.R.C. in counterpart Chinese Patent Application No. 200810008513.1.

*Primary Examiner* — David Lazaro
*Assistant Examiner* — Marie Georges Henry
(74) *Attorney, Agent, or Firm* — Sughrue Mion, PLLC

(57) ABSTRACT

An electronic device includes: a communication unit which communicates with an information server that stores predetermined information, a plurality of address-offering servers that store IP addresses existing in a network and provide any one of the stored IP addresses, and a management server that includes area information on the network where the information server is located; and a controller which performs a request for an IP address of the information server for the use of information stored in the information server from the plurality of address-offering servers and the management server, checks whether the provided IP address can be used to the plurality of the address-offering servers and the management servers if one of the plurality of address-offering servers provides the IP address of the information server, and controls the communication unit to receive the information from the information server based on the IP address if a positive response signal for the use of the IP address is received from the management server.

16 Claims, 6 Drawing Sheets

U.S. PATENT DOCUMENTS

| | | |
|---|---|---|
| 2005/0125575 A1 | 6/2005 | Alappat et al. |
| 2005/0177750 A1* | 8/2005 | Gasparini et al. ............ 713/201 |
| 2006/0047853 A1* | 3/2006 | Igarashi et al. ............... 709/245 |
| 2006/0069807 A1* | 3/2006 | Tagawa ......................... 709/245 |
| 2006/0200539 A1 | 9/2006 | Kappler et al. |
| 2009/0037603 A1* | 2/2009 | Battello et al. ................ 709/245 |

* cited by examiner

ELECTRONIC DEVICE, MANAGEMENT SERVER, AND CONTROL METHOD THEREOF FOR CHECKING AN IP ADDRESS

CROSS-REFERENCE TO RELATED APPLICATION

This application claims priority from Korean Patent Application No. 10-2007-0012243 filed on Feb. 6, 2007 in the Korean Intellectual Property Office, the disclosure of which is incorporated herein by reference.

BACKGROUND OF THE INVENTION

1. Field of the Invention

The present invention relates to an electronic device, a management server, and a control method thereof.

More particularly, the present invention relates to an electronic device that receives information through a network, a management server, and a control method thereof.

2. Description of the Related Art

In general, electronic devices such as computers, display apparatuses, and personal digital assistants (PDA) include an internal memory that stores a variety of information necessary for the electronic devices. However, the capacity of the memory needs to be increased to store increasingly large amounts of information.

Therefore, recent technology provides an information server for storing information to be used by accessing the information server through a network.

Particularly, the use of electronic devices that use a preboot execution environment (PXE) function to boot with a network card (e.g., LAN card) has widely expanded. Herein, the PXE function is included in a basic input/output system (BIOS), and boots the system through a network. The PXE function is a technology that expands the dynamic host configuration protocol (DHCP).

The PXE function can boot the system even though information required for booting such as a boot image, etc., is not stored locally, and therefore it does not require a hard disk.

Hereinafter, an electronic device system including a conventional electronic device 10 that is booted by using a PXE function will be described in detail with reference to FIG. 1. As shown in FIG. 1, the electronic device system includes the electronic device 10 having a LAN card, a PXE server 40 that stores a booting image for booting the electronic device 10, a DHCP server 20 that provides an Internet protocol (IP) address of the PXE server 40, and a boot strap protocol (BOOTP) server 30 that manages the IP address provided by the DHCP server 20.

The electronic device 10 is set to be booted through the PXE function, and it is assumed that the electronic device 10, the PXE server 40, the DHCP server 20, and the BOOTP server 30 are included in the same network area.

When power is applied to the electronic device 10, the electronic device 10 transmits a discover message to request an IP address from the PXE server 40. The discover message is broadcasted, and therefore the message can be transmitted to the PXE server 40, the DHCP server 20, and the BOOTP server 30 in the same network.

The DHCP server 20 and the BOOTP server 30 that receive the message return messages including the IP address of the PXE server 40 to the electronic device 10. The electronic device 10 selects one of the received offer messages, and transmits a request message that has the same contents as the selected offer message to the server that has transmitted the selected offer message. In general, the electronic device 10 selects the first-arrived offer message.

If a positive response signal (i.e., ACK) to the request message arrives, the electronic device 10 is booted by using the IP address included in the offer message to access the PXE server, which then transmits a booting image.

However, though the conventional electronic device system is located in the same network as the PXE server 40 is located, a DHCP server 20 having an IP address band different from the PXE server 40 or the BOOTP server 30 may be included in the network. For example, a network may be set up incorrectly, or a plurality of DHCP servers 20 may exist in one network due to a mistake of a user.

In this case, an incorrect IP address may be transmitted to the electronic device 10 so that the electronic device 10 cannot access the PXE server 40 and as such cannot finish booting.

The above information disclosed in this Background section is only for the enhancement of understanding of the background of the invention and therefore it may contain information that does not form the prior art that is already known to a person of ordinary skill in the art.

SUMMARY OF THE INVENTION

Accordingly, it is an aspect of the present invention to provide an electronic device, a management server, and control methods thereof to prevent an erroneous IP address set up for an information server from being used, when receiving information from the information server by accessing the information server through a network.

The foregoing and/or other aspects of the present invention are also achieved by providing an electronic device including: a communication unit which communicates with an information server that stores predetermined information, a plurality of address-offering servers that store IP addresses existing in a network and provide any one of the stored IP addresses, and a management server that includes area information about the network in which the information server resides; and a controller which requests the IP address of the information server for the use of information stored in the information server from the plurality of address-offering servers and the management server, checks whether the provided IP address can be used to the plurality of the address-offering servers and the management servers if one of the plurality of address-offering servers provides the IP address of the information server, and controls the communication unit to receive the information from the information server based on the IP address if a positive response signal for the use of the IP address is received from the management server.

According to an aspect of the invention, if a negative response signal for the use of the IP address is received from the management server, the controller re-requests the IP address of the information server for the use of the information stored in the information server from the plurality of address-offering servers and the management server.

According to an aspect of the invention, the information stored in the information server includes booting information for booting the electronic device.

According to an aspect of the invention, the controller controls the communication unit to broadcast the request for the IP address and the information on whether the provided IP address can be used.

According to an aspect of the invention, the electronic device further includes a display unit for displaying an image.

The foregoing and/or other aspects of the present invention are also achieved by providing a control method of an electronic device, the control method including: requesting an IP address of an information server for the use of information stored in the information server from a plurality of address-offering servers that store IP addresses in a network and provide one of the stored IP addresses, and a management server that includes area information on the network where the information server is located; checking whether the IP address of the information server is provided from one of the plurality of address-offering addresses in response to the request; informing the plurality of address-offering servers and the management server whether the provided IP address can be used when the IP address is provided; and communicating with the information server based on the IP address if a positive response signal for the use of the IP address is transmitted from the management server.

According to an aspect of the invention, the request for the IP address of the information server for using information stored in the information server from the plurality of address-offering servers and the management server is repeated if a negative response signal for the use of the IP address is received from the management server.

According to an aspect of the invention, the information stored in the information server includes booting information for booting the electronic device.

According to an aspect of the invention, the IP address request and the information on whether the provided IP address can be used are broadcasted network-wide.

The foregoing and/or other aspects of the present invention are also achieved by providing a management server including: a communication unit which communicates with an electronic device located in a network where the management server is located; a storage unit which stores area information on a network where an information server storing predetermined information is located; and a controller which controls the communication unit to transmit a positive response signal to the electronic device if an IP address is included in the area information stored in the storage unit when the electronic device receives the IP address from one of a plurality of address-offering servers providing IP addresses and checks whether the IP address can be used.

According to an aspect of the invention, the controller controls the communication unit to transmit a negative response signal if the IP address transmitted by the electronic device is not included in the area information stored in the storage unit.

The foregoing and/or other aspects of the present invention are also achieved by providing a control method of a management server, the control method including: receiving an IP address provided by one of a plurality of address-offering servers providing IP addresses and checking whether the IP address can be used from an electronic device; checking whether the IP address is included in area information on a network where an information server storing predetermined information is located; and transmitting a positive response signal to the electronic device if the IP address is included in the area information.

According to an aspect of the invention, the control method further includes transmitting a negative response message to the electronic device if the IP address informed by the electronic device is not included in the area information stored in the storage unit.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
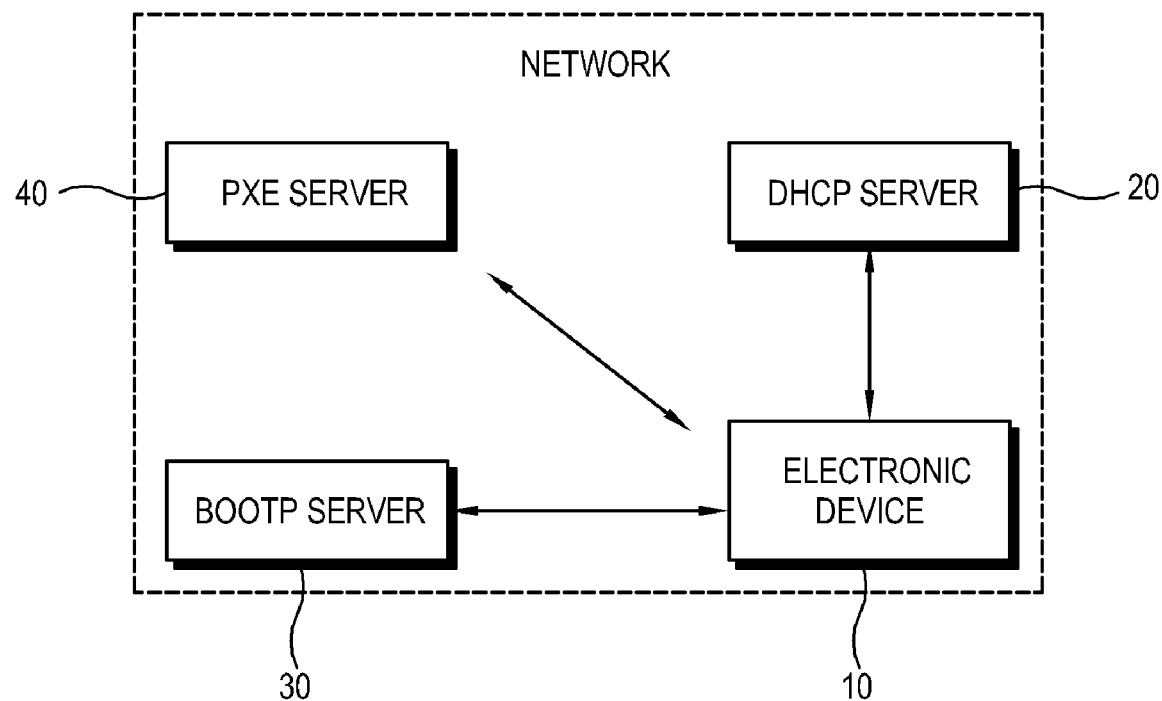
FIG. 1 is a control block diagram of an electronic device system including a conventional electronic device.

Reference will now be made in detail to the embodiments of the present invention, examples of which are illustrated in the accompanying drawings, wherein like reference numerals refer to like elements throughout. The embodiments are described below to explain the present invention by referring to the figures.

Figure 2:
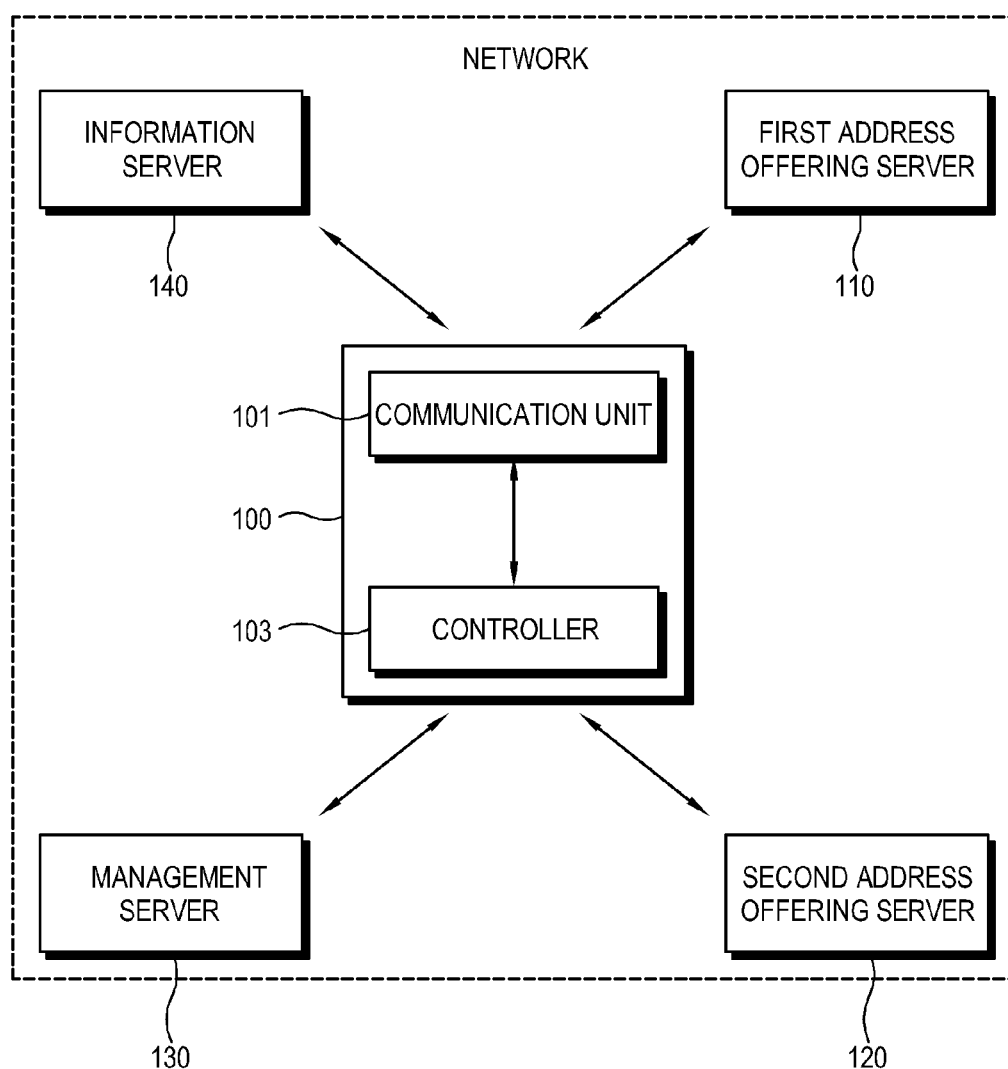
FIG. 2 is a control block diagram of an electronic device system including an electronic device and a management server according to an exemplary embodiment of the present invention.

FIG. 2 shows an electronic device system including an electronic device 100 according to an exemplary embodiment of the present invention. As shown in FIG. 2, the electronic device system includes the electronic device 100, an information server 140, address-offering servers 110 and 120, and a management server 130. It is assumed that the electronic device system exemplarily includes a first address-offering server 110 and a second address-offering server 120 according to the present exemplary embodiment.

As shown in FIG. 2, the electronic device 100 includes a communication unit 101 and a controller 103.

The communication unit 101 communicates with the information server 140, a plurality of the address-offering servers 110 and 120, and the management server 130 in the same network by control of the controller 103. The communication unit 101 can be provided as a local area network (LAN) card, and the communication protocol of the communication unit 101 is based on TCP/IP.

The controller 103 requests the Internet protocol (IP) address of the information server from the management server 130 and controls the communication unit 101 to communicate with the information server 140 based on the IP address provided from the management server 130 if a positive response signal (ACK) for a use of the provided IP address is transmitted by the management server 140. The controller 103 can be provided as a controller such as a central processing unit (CPU) or a microcomputer (MICOM).

The controller 103 requests the IP address of the information server 140 from the first address-offering server 110, the second address-offering server 120, and the management server 130 in the same network where the information server 140 is located so as to use information stored in the information server 140. In this case, the controller 103 can request the IP address of the information server 140 by broadcasting a discover message for requesting the IP address. When broadcasting the discover message, the controller 103 sets a source address of the discover message to be 0.0.0.0 and a destination address of the discover message to be 255.255.255.255.

When offer messages including the IP address are provided by the first address-offering server 110, the second address-offering server 120, and the management server 130 that have received the discover message, the controller 103 selects one of the offering messages. Preferably, the controller 103 may select the first arrived offer message.

In addition, the controller 103 broadcasts a request message having the same contents as the selected offer message to check whether the IP address included in the offer message can be used.

If a positive response message (ACK) for the request message is received from the management server 130, the controller 103 controls the communication unit 101 to communicate with the information server 140 based on the IP address included in the offer message.

If a negative response signal (NACK) for the request message is received from the management server 130, the controller 103 broadcasts the discover message to the first and second address-offering servers 110 and 120 and the management server 130 and repeats the process of requesting the IP address again.

Although it is not shown in FIG. 2, the electronic device 100 according to the present exemplary embodiment may include a display unit on which an image is displayed, and the display unit may be provided as a monitor including a computer therein.

The information server 140 according to the present exemplary embodiment stores various predetermined information necessary for the electronic device 100, and can be provided as a preboot execution environment (PXE) server. Since the information server 140 has an exclusive IP address, the electronic device 100 can communicate with the information server 140 based on the IP address of the information server 140.

The information server 140 can store a booting image for booting the electronic device 100, as well as predetermined programs, documents, and images. In addition, the information server 140 provides a path and a file name for the stored information through communication with the electronic device 100 so that the electronic device 100 can use the information.

The first address-offering server 110 and the second address-offering server 120 store all IP addresses in the same network, and provide one of the stored IP addresses when an IP address request is received from the electronic device 100. The first and second address-offering servers 110 and 120 can be provided as DHCP servers.

When receiving the IP address request from the electronic device 100, the first address-offering server 110 can broadcast an offer message including an IP address that can be offered, a subnet mask for the IP address, the corresponding gateway, and domain name server (DNS) additional information.

When a request message for the offer message is transmitted from the electronic device 100, the first address offer server 110 can transmit a positive response signal (ACK) or a negative response signal (NACK).

The management server 130 stores area information on a network where the information server 140 is located, and determines whether the IP address offered to the electronic device 100 is included in the area information. The management server 130 can be provided as a boot strap protocol (BOOTP) server.

Figure 3:
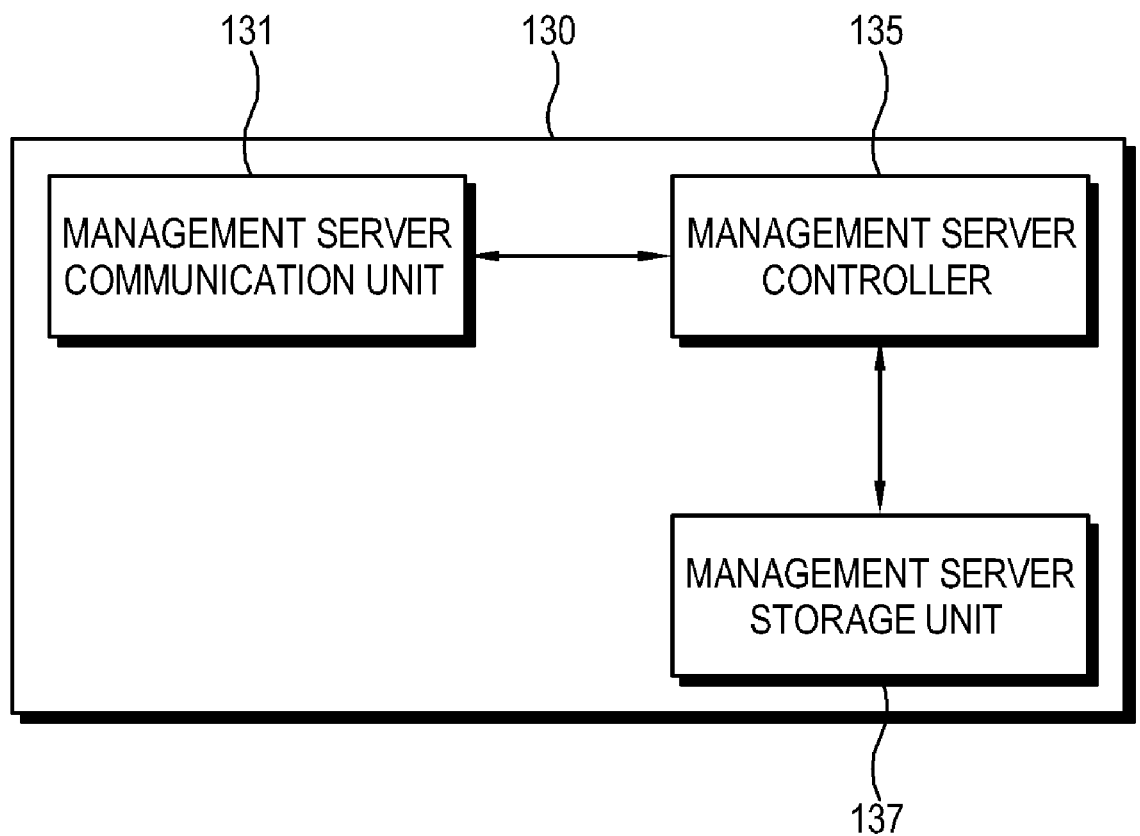
FIG. 3 is a control block diagram of the management server according to the exemplary embodiment of the present invention.

As shown in FIG. 3, the management server 130 includes a management server communication unit 131 that communicates with the electronic device 100 through the network, a management server storage unit 137 that stores the area information, and a management server controller 135.

The management server storage unit 137 stores the area information of the network where the information server 140 is located. In this case, the area information includes information on a network area range set for the management server 130 to manage and the IP address.

The management server controller 135 determines the IP address offered to the electronic device 100 and provides a response message (ACK or NACK) to the electronic device 100. The management server controller 135 can be provided by a controller such as a CPU or MICOM.

In detail, when receiving the request message from the electronic device 100, the management server controller 135 determines whether the IP address included in the request message is included in the area information stored in the management server storage unit 137.

As described above, the electronic device 100 broadcasts the request message having the same contents as the offer message to check whether the IP address offered through the offer message can be used. Therefore, the management server controller 135 may also receive the request message, and determines the IP address included in the offer message by checking the request message.

In addition, the management server controller 135 controls the management server communication unit 131 to transmit a positive response signal (ACK) if the IP address included in the request message is included in the area information, and to transmit a negative response signal (NACK) if the IP address is not included in the area information, to the electronic device 100.

In this case, the management server controller 135 transmits a positive response signal (ACK) or a negative response signal (NACK) before the first or second address-offering server 110 or 120, which has transmitted the offer message to the electronic device 100, transmits the positive response signal (ACK) or the negative response signal (NACK).

As described, when an address-offering server has a different IP address band, the management server 130 determines whether the address-offering server provides an invalid IP address, and therefore, the electronic device 100 can be prevented from receiving the wrong IP address.

The management server controller 135 can control the management server communication unit 131 to broadcast the offer message including the IP address like the first and second address-offering servers 110 and 120 when receiving the IP address request from the electronic device 100.

Figure 4:
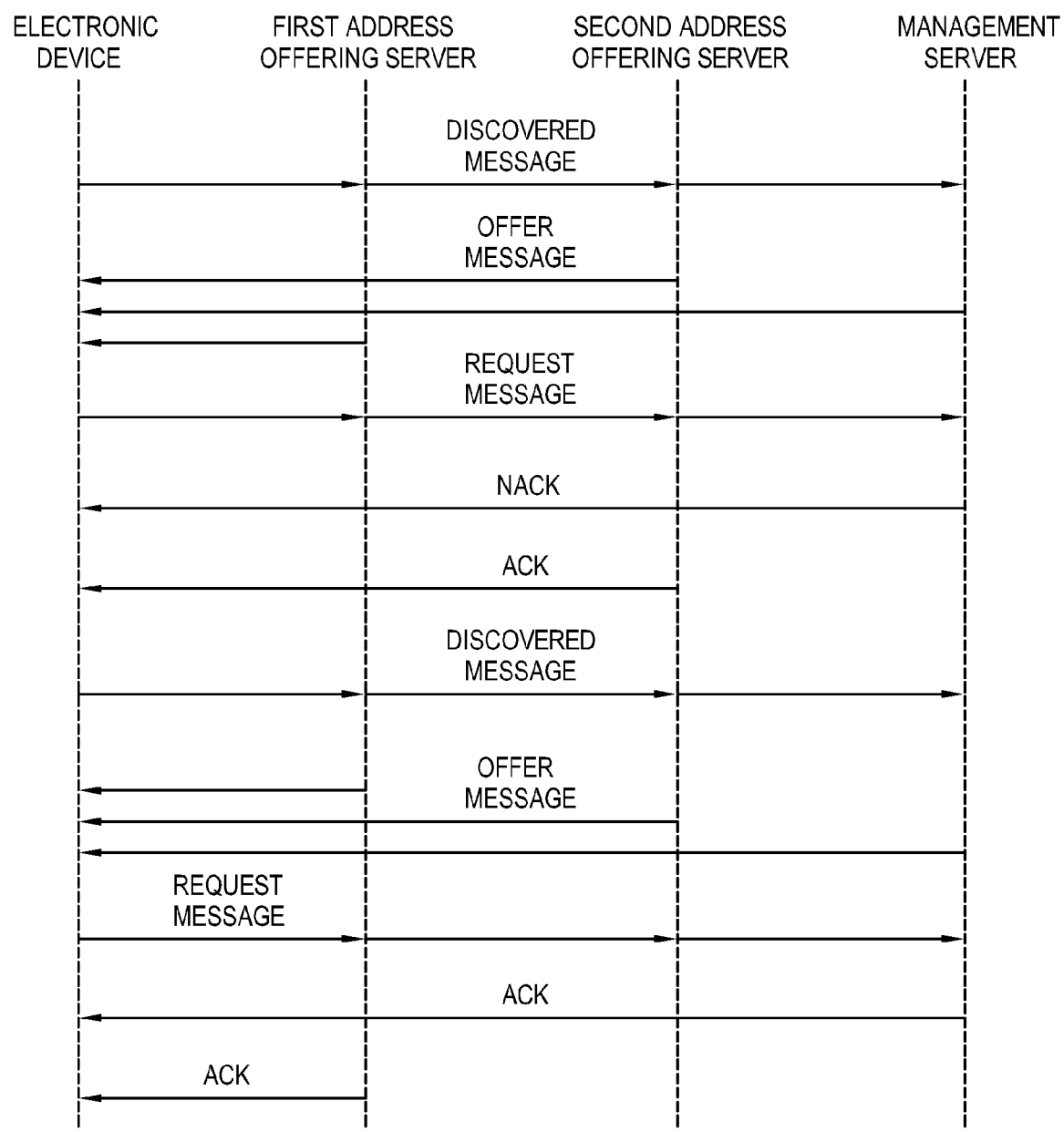
FIG. 4 shows a communication process of the electronic device to set an IP address according to the exemplary embodiment of the present invention.

Hereinafter, the electronic device system will be described in detail with reference to FIG. 4. FIG. 4 shows communication between the first address-offering server 110, the second address-offering server 120, the management server 130, and the electronic device 100 in the electronic device system to set the IP address of the electronic device 100 according to the exemplary embodiment of the present invention. It is assumed that an incorrect IP address set in the second address-offering server 120 is offered to the electronic device 100.

The electronic device 100 broadcasts a discover message to request the IP address of the information server 140. When receiving the discover message, the first address-offering server 110, the second address-offering server 120, and the management server 130 provide offer messages, each including the IP address, to the electronic device 100.

If the offer messages are received, the electronic device 100 selects the first arrived message (in this instance, the offer message of the second address-offering server 120) and broadcasts a request message having the same contents as the selected offer message.

In this case, the management server 130 determines the IP included in the request message, and transmits the negative response signal (NACK) if the IP address offered from the second address-offering server 120 is not included in the area information.

If the NACK signal is received, the electronic device 100 returns to the process of broadcasting the discover message for requesting the IP address of the information server 140.

If the ACK signal from the management server 130 is received, the electronic device 100 communicates with the information server 140 based on the IP address included in the offer message. In addition, the electronic device 100 receives the information stored in the information server 140.

For example, when the electronic device 100 is booted by using the PXE function, as shown in FIG. 4, the electronic device 100 performs communication to receive the IP address. In addition, the electronic device 100 communicates with the information server 140 based on the received IP address, and finishes the booting process by downloading the booting image stored in the information server 140.

Through the above process, the electronic device 100 can be prevented from being allocated an incorrect IP address when the address-offering server has a different IP address band, since the management server 130 checks whether the address-offering server offers the wrong IP address.

A method for controlling the electronic device 100 according to the exemplary embodiment of the present invention will be described in detail with reference to a flowchart in FIG. 5.

Figure 5:
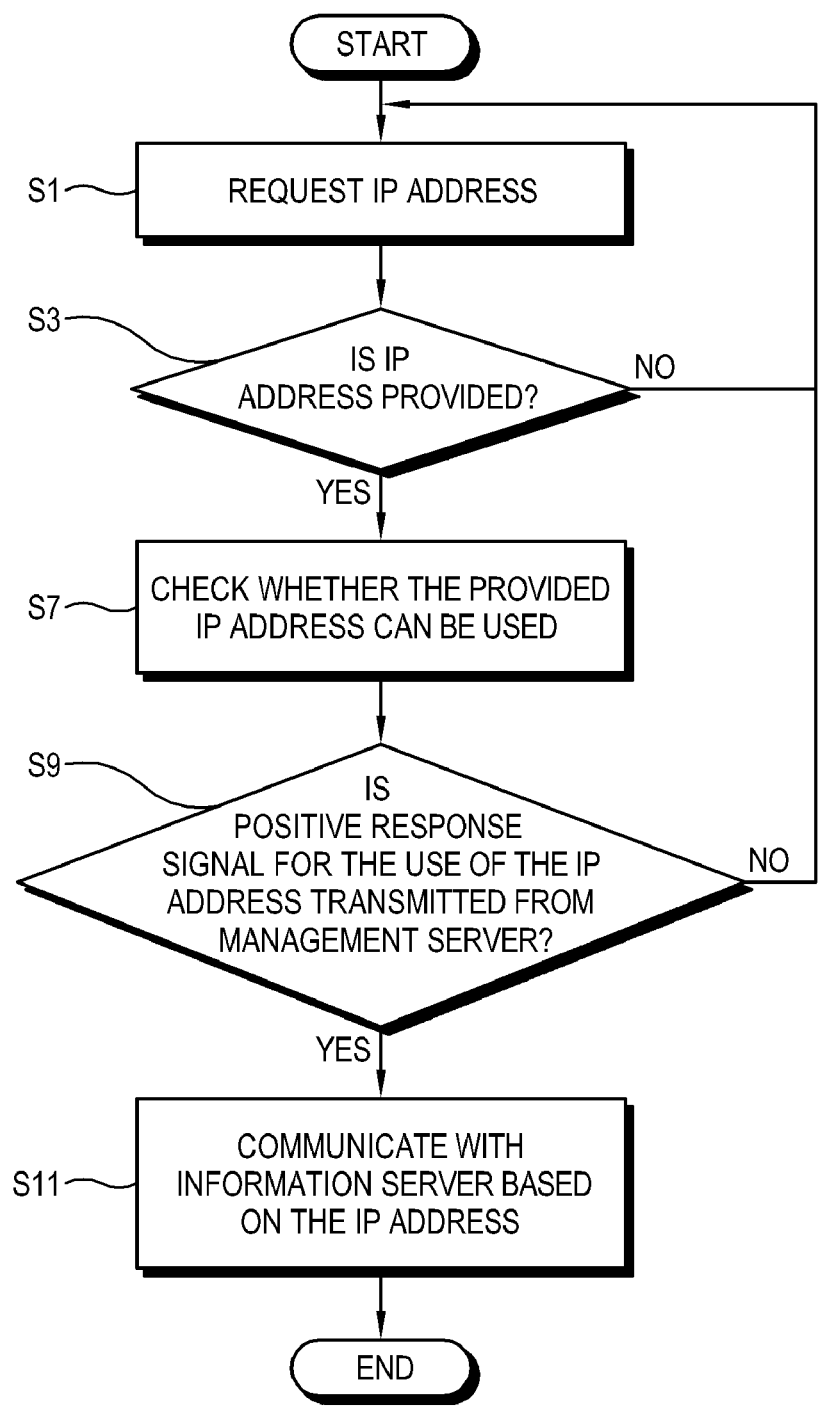
FIG. 5 is a control block diagram of a control process of the electronic device according to the exemplary embodiment of the present invention.

As shown in FIG. 5, the electronic device 100 broadcasts a discover message requesting an IP address to use information stored in the information server 140 in operation S1.

After receiving offer messages, each including the IP address, from the first address-offering server 110, the second address-offering server 120, and the management server 130 in operation S3, the electronic device 100 broadcasts a request message to check whether the IP address included in the offer message can be used, in operation S7.

Then, the electronic device 100 determines whether the ACK signal has been transmitted from the management server 130 as a response to the request, in operation S9.

When it is determined in operation S9 that the ACK signal has arrived, the electronic device 100 communicates with the information server 140 based on the IP address included in the offer message, in operation S11.

When it is determined in operation S9 that the NACK signal has arrived, the process is repeated from operation S1.

A method for controlling the management server 130 according to the exemplary embodiment of the present invention will be described with reference to the flowchart in FIG. 6.

Figure 6:
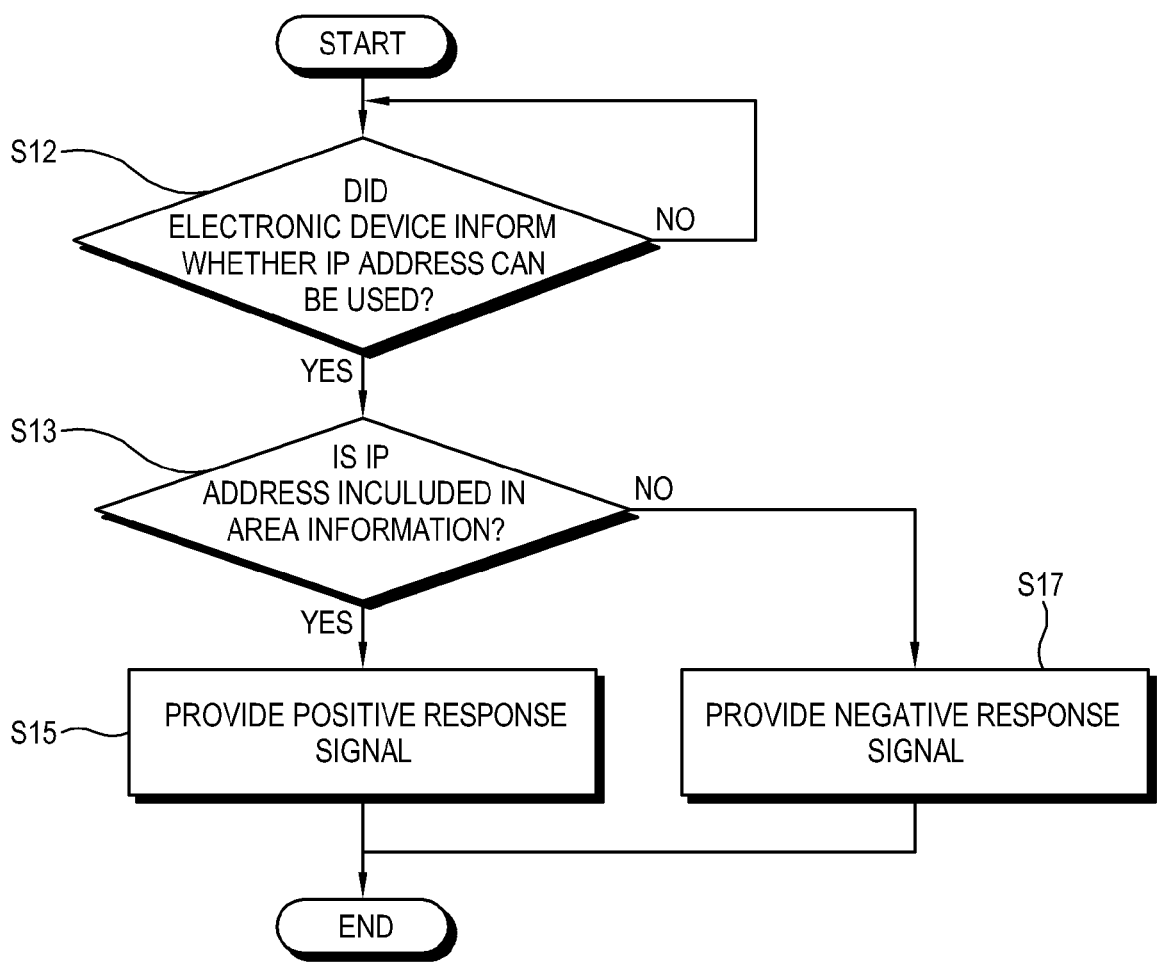
FIG. 6 is a control block diagram of a control process of the management server according to the exemplary embodiment of the present invention.

As shown in FIG. 6, the management server 130 receives the request message for information on whether the IP address can be used from the electronic device 100 in operation S12, and determines whether the IP address included in the request message is included in the area information in operation S13.

If it is determined in operation S13 that the IP address is included in the area information, the management server 130 transmits the ACK signal to the electronic device 100.

If it is determined in operation S13 that the IP address is not included in the area information, the management server 130 transmits the NACK signal to the electronic device 100.

Through the above process, the electronic device 100 can be prevented from receiving an incorrect IP address when the address-offering server has a different IP address band, since the management server 130 checks whether the address-offering server offers an incorrect IP address.

As described above, an electronic device and a management server prevent an incorrect IP address from being provided to the electronic device by checking whether the wrong IP address is provided by an address-offering server.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An electronic device comprising:
    a communication unit which performs communication with an information server that stores predetermined information, a plurality of address-offering servers that store IP addresses existing in a network and provide any one of the stored IP addresses, and a management server that includes area information on the network where the information server is located; and
    a controller which performs a request for an IP address of the information server for the use of information stored in the information server from the plurality of address-offering servers and the management server, wherein the IP address of the information server uniquely identifies the information server within the network, determines if an IP address is provided by at least one of the plurality of the address-offering servers and the management server in response to the request, checks whether the IP address provided by the at least one of the plurality of the address-offering servers and the management server is a valid IP address of the information server, and controls the communication unit to receive the information from the information server by utilizing the provided IP address if a positive response signal for the use of the provided IP address is received from the management server.

2. The electronic device of claim 1, wherein, if a negative response signal for the use of the IP address is received from the management server, the controller re-requests the IP address of the information server for the use of the information stored in the information server from the plurality of address-offering servers and the management server.

3. The electronic device of claim 1, wherein the information stored in the information server comprises booting information for booting the electronic device.

4. The electronic device of claim 1, wherein the controller controls the communication unit to broadcast the request for the IP address and the information on whether the provided IP address is a valid IP address of the information server.

5. The electronic device of claim 1, further comprising a display unit for displaying an image.

6. A control method of an electronic device, the control method comprising:
    requesting an IP address which uniquely identifies an information server within a network for the use of predetermined information stored in the information server from a plurality of address-offering servers and a management server, wherein the plurality of address-offering servers store IP addresses existing in the network and provide any one of the stored IP addresses, and a management server that includes area information on the network where the information server is located;

determining if the IP address of the information server is received from at least one of the plurality of address-offering servers and the management server in response to the requesting the IP address;

checking whether the IP address received from the at least one of the plurality of address-offering servers and the management server is a valid IP address of the information server;

informing the plurality of address-offering servers and the management server of the received IP address in response to the received IP address; and communicating with the information server based on the received IP address if a positive response signal for the use of the received IP address is transmitted from the management server.

7. The control method of claim 6, wherein the requesting of the IP address of the information server for using information stored in the information server from the plurality of address-offering servers and the management server is repeated if a negative response signal for the use of the IP address is received from the management server.

8. The control method of claim 6, wherein the information stored in the information server comprises booting information for booting the electronic device.

9. The control method of claim 6, wherein the requesting of the IP address and the informing of the received IP address are broadcasted.

10. A management server comprising:
a communication unit which communicates with an electronic device located in a network where the management server is located;
a storage unit which stores area information on a network where an information server storing predetermined information is located; and
a controller which receives an IP address of the information server from the electronic device, checks whether the received IP address of the information server is included in the area information stored in the storage unit, and controls the communication unit to transmit a
positive response signal to the electronic device if the received IP address of the information server is included in the area information stored in the storage unit,
wherein, upon receiving the IP address from the electronic device, the controller checks the area information and determines from the area information whether the received IP address is a valid IP address of the information server which uniquely identifies the information server within the network for use by the electronic device for accessing the predetermined information stored in the information server.

11. The management server of claim 10, wherein the controller controls the communication unit to transmit a negative response signal if the IP address informed from the electronic device is not included in the area information stored in the storage unit.

12. The management server of claim 10, wherein the predetermined information stored in the information server comprises booting information for booting the electronic device.

13. The management server of claim 10, wherein the controller checks whether the received IP address is a valid IP address of the information server.

14. A control method of a management server, the control method comprising:
receiving, from an electronic device, an IP address provided to the electronic device by one of a plurality of address-offering servers providing IP addresses and checking whether the IP address can be used by the electronic device;
checking whether the received IP address is included in area information on a network where an information server storing predetermined information is located; and
transmitting a positive response signal to the electronic device if the received IP address is included in the area information,
wherein the received IP address is an IP address of the information server that uniquely identifies the information server on the network,
wherein, upon receiving the IP address from the electronic device, checking whether the IP address can be used by the electronic device by checking the area information and determining from the area information whether the received IP address is a valid IP address of the information server which uniquely identifies the information server within the network for the use by the electronic device for accessing the predetermined information stored in the information server.

15. The control method of claim 14, further comprising transmitting a negative response message to the electronic device if the IP address received from the electronic device is not included in the area information stored in the storage unit.

16. The control method of claim 14, wherein the predetermined information stored in the information server comprises booting information for booting the electronic device.

* * * * *